United States Patent
Eckhardt

(10) Patent No.: US 9,168,798 B2
(45) Date of Patent: Oct. 27, 2015

(54) APPARATUS FOR INTRODUCING AIR AND/OR SEALANT INTO A TIRE

(75) Inventor: Arnold Eckhardt, Ranstadt (DE)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 257 days.

(21) Appl. No.: 13/823,556

(22) PCT Filed: Feb. 28, 2012

(86) PCT No.: PCT/EP2012/053328
§ 371 (c)(1),
(2), (4) Date: Apr. 1, 2013

(87) PCT Pub. No.: WO2012/146413
PCT Pub. Date: Nov. 1, 2012

(65) Prior Publication Data
US 2013/0220483 A1    Aug. 29, 2013

(30) Foreign Application Priority Data
Apr. 28, 2011   (DE) .......................... 10 2011 018 927

(51) Int. Cl.
*B60C 29/06* (2006.01)
*B29C 73/16* (2006.01)
*B60S 5/04* (2006.01)
*B29L 30/00* (2006.01)

(52) U.S. Cl.
CPC ............. *B60C 29/062* (2013.04); *B29C 73/166* (2013.01); *B60S 5/043* (2013.01); *B29L 2030/00* (2013.01)

(58) Field of Classification Search
CPC ............................... B29C 73/166; B60S 5/043
USPC ........... 141/38, 363, 365, 366, 373, 375, 386
See application file for complete search history.

(56) References Cited

U.S. PATENT DOCUMENTS

| | | | | |
|---|---|---|---|---|
| 4,787,429 A | * | 11/1988 | Valentini et al. | 141/383 |
| 4,986,322 A | * | 1/1991 | Chibret et al. | 141/319 |
| 5,607,004 A | * | 3/1997 | Cope | 141/340 |

(Continued)

FOREIGN PATENT DOCUMENTS

| DE | 69807140 T2 | 4/2003 |
|---|---|---|
| DE | 102004060662 A1 | 7/2006 |

(Continued)

OTHER PUBLICATIONS

International Search Report dated Jun. 4, 2012 for International Application No. PCT/EP2012/053328.

*Primary Examiner* — Timothy L Maust
(74) *Attorney, Agent, or Firm* — Birch Stewart Kolasch & Birch, LLP

(57) ABSTRACT

An apparatus for introducing air and/or sealant into a tire includes a container for the sealant which has an inlet and an outlet and a pressure generating means, wherein the inlet of the container is connectable to the pressure generating means and the outlet of the container (14) is connected or connectable to the inlet end (24) of a hose (20) whose outlet end is connectable to the tire to be filled. A latchable coupling is provided for connecting the pressure generation means to the inlet of the container, with two latching levers (50) provided at the container (14) being designed to release the locking convection of the coupling on a movement of the respective free lever ends toward one another.

27 Claims, 4 Drawing Sheets

(56) References Cited

U.S. PATENT DOCUMENTS

| | | | |
|---|---|---|---|
| 5,740,846 A * | 4/1998 | Larson et al. | 141/382 |
| 5,947,172 A | 9/1999 | Glotin | |
| 6,789,581 B2 * | 9/2004 | Cowan et al. | 141/38 |
| 6,964,284 B2 * | 11/2005 | Eckhardt | 141/38 |
| 7,370,678 B2 * | 5/2008 | Lætgaard | 141/38 |
| 8,505,591 B2 * | 8/2013 | Eckhardt | 141/38 |
| 8,517,063 B2 * | 8/2013 | Kanenari et al. | 141/38 |
| 8,522,833 B2 * | 9/2013 | Chou | 141/38 |
| 8,596,310 B2 * | 12/2013 | Senno et al. | 141/38 |
| 8,684,046 B2 | 4/2014 | Kojima et al. | |
| 2010/0005930 A1 | 1/2010 | Lolli et al. | |
| 2010/0186849 A1 | 7/2010 | Yoshida et al. | |
| 2011/0192492 A1 | 8/2011 | Kanenari et al. | |
| 2012/0037267 A1 | 2/2012 | Senno et al. | |

FOREIGN PATENT DOCUMENTS

| | | |
|---|---|---|
| EP | 1439053 A1 | 7/2004 |
| EP | 2163374 A1 | 3/2010 |
| JP | 2010-23244 A | 2/2010 |
| JP | 2011-98462 A | 5/2011 |
| WO | WO 2008/035163 A2 | 3/2008 |
| WO | WO 2010/047231 A1 | 4/2010 |
| WO | WO 2010/123113 A1 | 10/2010 |

* cited by examiner

APPARATUS FOR INTRODUCING AIR AND/OR SEALANT INTO A TIRE

The present invention relates to an apparatus for introducing air and/or sealant into a tire, in particular into an automobile tire, having a container for the sealant which has an inlet and an outlet and having a pressure generation means, in particular an electric pump or a compressor, wherein the inlet of the container is connectable to the pressure generation means and the outlet of the container is connected or connectable to the inlet end of a hose whose outlet end is connectable to the tire to be filled.

Such an apparatus can be carried along on a motor vehicle as a so-called puncture kit as a replacement for a spare wheel. Puncture kits can be used either only to inflate a tire or to seal and subsequently inflate a tire. Depending on whether a tire should only be inflated or both sealed and inflated, the container is either connected by a user to the pressure generation means by means of the hose or the container is omitted and only a hose is connected to the pressure generation means. Depending on the connection configuration, either a direct air throughflow thus takes place from the pressure generation means into the hose—without diversion through the container—or an air supply into the container takes place which has the consequence of a dispensing of sealant from the container into the hose. With a direct air throughflow, compressed air is discharged from the outlet end of the hose without sealant so that the apparatus can be used in the corresponding connection configuration for the pure inflation of a tire which is intact per se. With a diversion of the airflow delivered from the pressure generation means through the container, sealant is urged out of the container into the hose so that the apparatus can be used in this connection configuration for the sealing and subsequent inflation of a defective tire. It is in particular helpful for a change between the connection configurations if the container can be repeatedly connected to the pressure generation means and released from it again.

It is necessary in this respect to ensure a reliable connection, on the one hand, and to ensure an easy operability, on the other hand. It is therefore an object of the invention to enable a simple and reliable releasable connection of the container to the pressure generation means in an apparatus of the above-described kind.

The object is satisfied by an apparatus having the features of claim 1.

In accordance with the invention, a lockable coupling is provided for connecting the pressure generation means to the inlet of the container, with two locking levers provided at the container being designed to release the locking connection of the coupling on a movement of the respective free lever ends toward one another. A user who wants to release the locking connection in order, for example, to couple a hose to the pressure generation means without a container or to stow the puncture kit in the dismantled state, therefore only has to press the free lever ends together, for example by means of the thumb and index finger. The operability of the apparatus is thus facilitated since the releasing of the locking connection is possible with a fast and intuitive movement. The container with the hose can subsequently be removed from the pressure generation means.

Further developments of the invention are set forth in the dependent claims, in the description and in the enclosed drawing.

The locking levers are preferably biased into a locking position. For locking, the free lever ends accordingly only have to be released as soon as the container is in the correct position. The operation can be further simplified by this measure.

In accordance with an embodiment of the invention, the locking levers are elastically deformable and are biased into the locking position by their own tension. This allows a particularly simple construction since no separate spring devices are necessary.

The locking levers are preferably of identical design. In accordance with an embodiment of the invention, the locking levers are attached to the container at both sides of a connection stub. It is particularly simple for a user to grasp the locking levers, for example to release the coupling, and to pull the connection stub out of a corresponding socket at the pressure generation means—optionally while pressing the free lever ends together. The connection stub and the locking levers can be formed at a removal unit connected, preferably releasably, to the container. The removal unit can be screwable onto the container, for example. An emptied container can thus be replaced in a simple and fast manner in that the emptied container is unscrewed from the removal unit and a filled container is screwed on.

In accordance with a further embodiment, latch noses are provided at the locking levers and latch into corresponding cut-outs at the pressure generation means when the pressure generation means is connected to the inlet of the container. The locking of the coupling thus takes place automatically without the assistance of the user as soon as the container has reached its correct position. A release of the latch connection can take place in a simple manner by pressing the two free lever ends together.

Knurled actuation sections can be provided at mutually remote outer sides of the free lever ends to enable a simple and secure grasping of the lever ends.

The actuation sections can be angled with respect to a longitudinal axis of the locking levers in order hereby to make the grasping of the lever ends even more comfortable.

In accordance with an embodiment of the invention, the locking levers are formed by a strip of elastic material which is bent in U shape and which is connected at a vertex to the container, in particular to a removal unit of the container. The strip-shaped locking levers can in particular be made in one piece with the removal unit. In particular plastic can be considered as the elastic material.

The locking levers can each be connected to the container by a transversely disposed stiffening web at a support position spaced apart from the vertex. The stability of the arrangement and in particular the bias force can hereby be increased.

Respective connector stubs which are arranged mutually offset by 180° can be associated with the inlet and the outlet of the container. In other words, the two connector stubs are arranged coaxially and not angled, for instance. This has the advantage that the container can be coupled in a particularly simple manner between the pressure generation means and the hose.

A common direction of flow defined by the connection stubs in this manner preferably extends parallel to the respective longitudinal axis of the locking levers.

The pressure generation means can be accommodated in a housing which has a cut-out which receives a section of the container, in particular a removal unit of the container. A particularly stable connection is hereby possible between the housing having the pressure generation means and the container. The housing can, for example, be accommodated at an easily accessible location in the trunk of a motor vehicle. The housing can generally be arranged lying in the position of use of the apparatus. The housing can furthermore form a pedestal for the container. The housing is therefore simply placed on the floor for the use of the apparatus, with the container then being in the correct position of use. To ensure a reliable holding for the container at such a pedestal, the cut-out can be provided at a side of the housing so that a removal unit connected to the container can be plugged into the housing from the side.

The free lever ends of the container connected to the pressure generation means preferably project out of the cut-out so that they are easy to grasp.

A connection for the lockable coupling of the container can be arranged in the cut-out. To connect the container to the pressure generation means, a removal unit of the container is, for example, introduced into the cut-out, with a coupling plug of the lockable coupling moving into engagement with the connection designed as a coupling socket and the inlet of the container thus being connected to the pressure generation means.

The container or a removal unit connected to the container can preferably be plugged into the cut-out from the side with an apparatus located in the position of use. In comparison with a plugging in from above, this allows a more comfortable handling of the apparatus. The cut-out can in particular be open both upwardly and to the side for this purpose.

Recesses into which respective latching noses of the locking levers can latch are preferably provided at a side wall of the cut-out. Furthermore, respective slide guides can be provided at the housing and at the container to guide the container on the coupling together of the container and the pressure generation means. In this manner, the coupling together is facilitated since a jamming of coupling components as a consequence of a misalignment of the container is avoided.

The housing can have an outwardly open hollow receiving space for a hose connectable to the container and for a cable with plug for connecting the pressure generation means to an electric energy source. The hose and the cable are thus always at hand for a user.

The hollow receiving space can in particular be designed so that the cable with plug can be accommodated in a first inner section of the hollow receiving space and the remaining outer section of the hollow receiving space is just sufficient for receiving the hose. This enables a particularly space saving design of the housing. In addition, the operation of the apparatus is facilitated for a user in that the hose and cable can be removed from the housing in the correct order.

The invention will be described in the following with reference to an embodiment and to the drawings.

Figure 1:
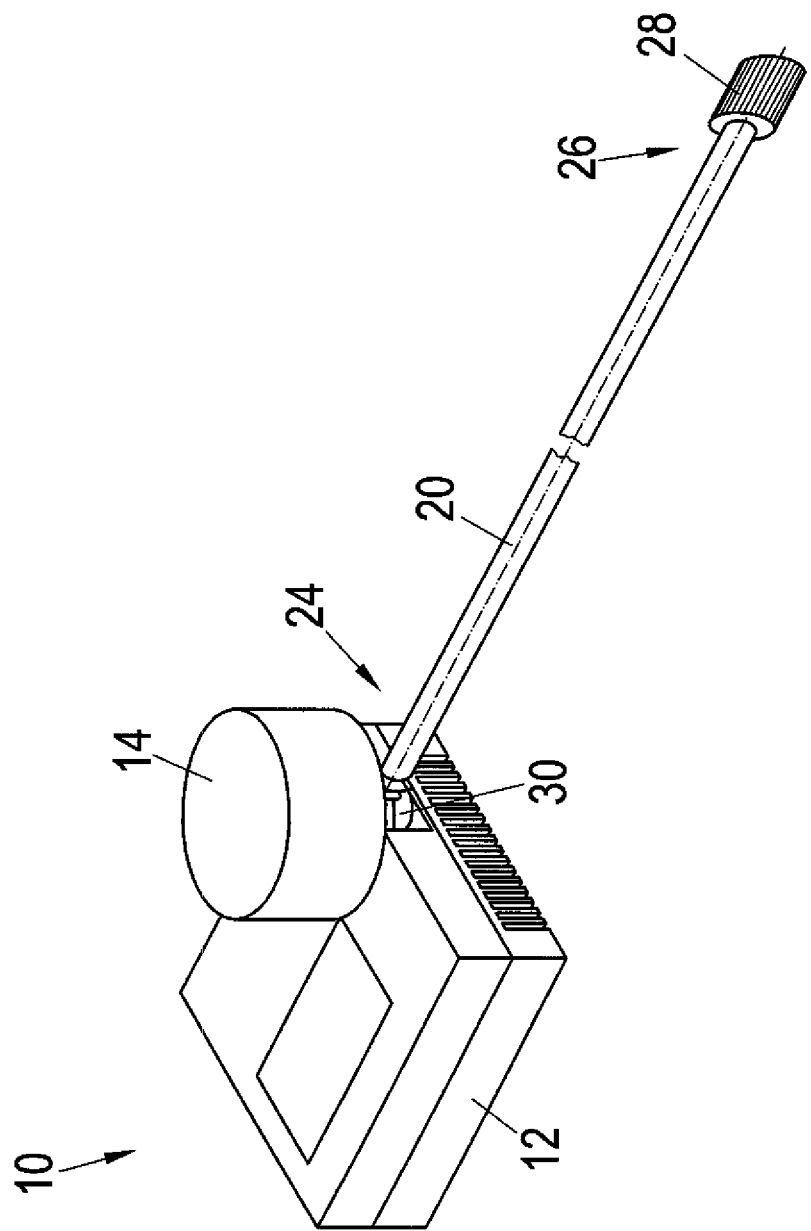
FIG. 1 shows a perspective view of an apparatus in accordance with the invention for introducing air and/or sealant into a tire.

FIG. 1 shows an apparatus 10 in accordance with the invention which is arranged in the position of use and which includes a housing 12, which has a compressor unit, not recognizable here, a container 14 with sealant and a hose 20.

The compressor unit can include a compressor for the pressurizing of environmental air and an electric motor as a drive for the compressor which are likewise not recognizable in the drawings. The compressor unit is furthermore equipped with a manometer 22 recognizable in FIG. 2 and for the display of the air pressure generated by the compressor. The compressor unit can be supplied with electric energy, for example, from a cigarette lighter of a motor vehicle, by means of an electrical connection cable, not shown.

The hose 20 has an inlet end 24 and an outlet end 26, with the outlet end 26 having a corresponding connection piece 28 for the connection of the hose 20 to a tire valve, for example a so-called VG8 screw connection.

The container 14 has an inlet as well as an outlet. In the connection configuration shown in FIG. 1, the inlet of the container 14 is connected to the compressor and the outlet of the container 14 is connected to the hose 20. On an activation of the compressor, for example by actuation of a switch, sealant can thus be introduced from the container 14 into a tire to be sealed. After emptying the container 14, the tire can be inflated directly in this manner. In accordance with an alternative connection configuration, not shown, the hose 20 is directly connected to the compressor, whereas the container 14 is placed to one side, for example Compressed air can thus be introduced into a tire to be filled which is intact per se without adding sealant or only the filling level of the tire can be checked using the manometer 22.

A removal of the container 14 and of the hose 20 can take place, for example, after an introduction of sealant into a tire has taken place or at the end of the shelf life of the sealant in the container 14 to provide a new container and, where necessary, a new hose.

To change to and fro between the first and the second connection configurations, the compressor, the container 14 and the hose 20 have to be alternately coupled to one another and decoupled from one another.

Figure 2:
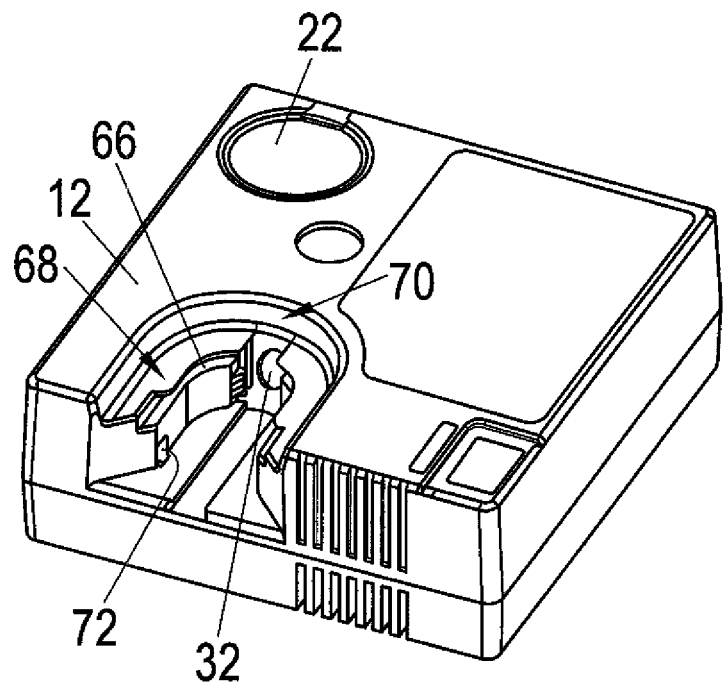
FIG. 2 shows a perspective view of a housing, in which a pressure generation means of the apparatus in accordance with FIG. 1 is accommodated, from above.
Figure 3:
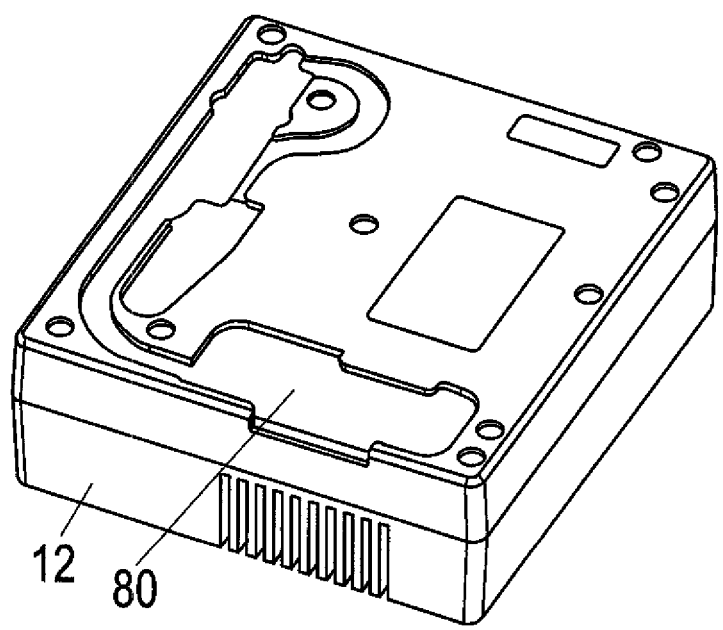
FIG. 3 shows the housing in accordance with FIG. 2 from below.
Figure 4:
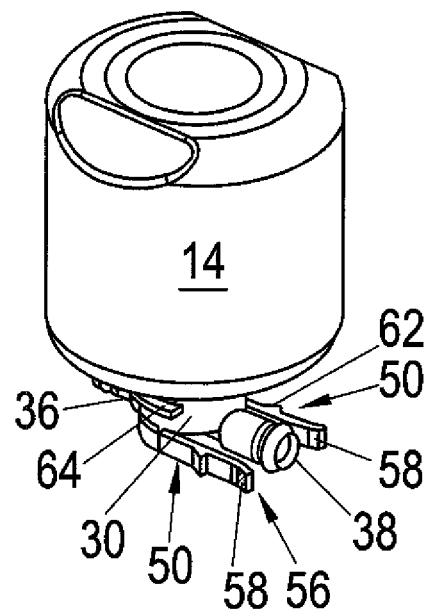
FIG. 4 shows a perspective view of a container of the apparatus in accordance with FIG. 1.
Figure 5:
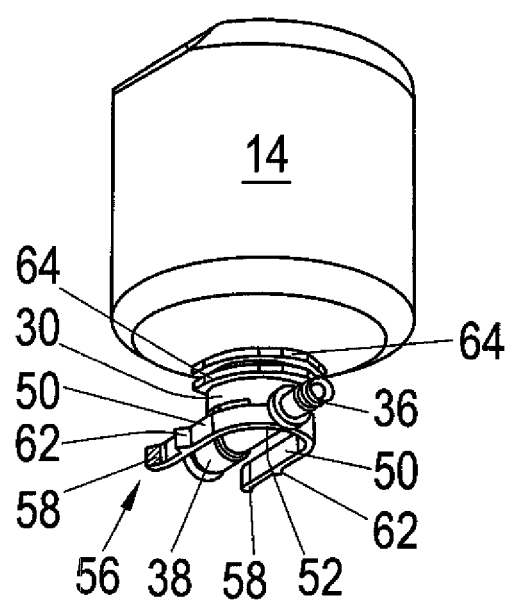
FIG. 5 shows a further view of the container in accordance with FIG. 4.
Figure 6:
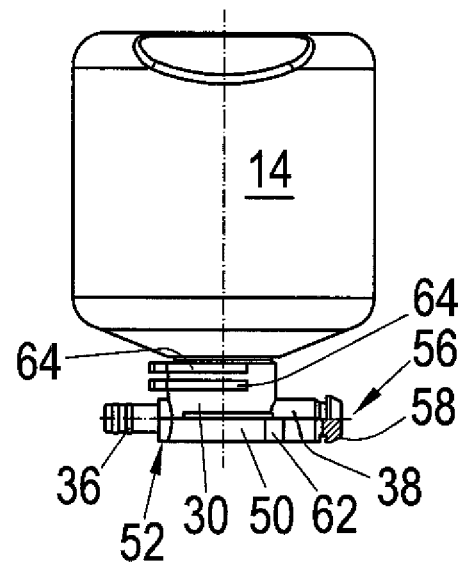
FIG. 6 shows a side view of the container in accordance with FIG. 4.
Figure 7:
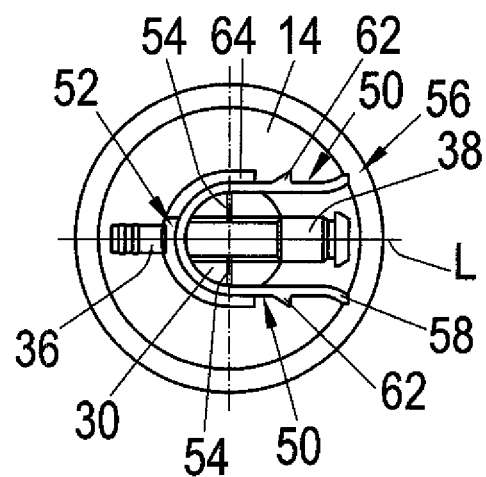
FIG. 7 shows a view of the container in accordance with FIG. 4 from below.

The housing 12 with the compressor unit is shown without a container 14 and without a hose 20 in FIGS. 2 and 3. An outwardly open hollow receiving space 80 into which the hose 20 can be introduced when the apparatus is to be stowed away is provided at a lower side of the housing 12. In addition, a cable with plug, not shown, for connecting the compressor to an electric energy source can also be introduced into the hollow receiving space 80. The hollow receiving space 80 is preferably divided into two sections, with the inner section, or the section extending more deeply into the housing 12, serving the accommodation of the cable and the outer section, or the section extending less deeply into the housing 12, serving the accommodation of the hose 20.

The inlet and the outlet of the container, which can both be simply realized by the container neck, both open into a removal unit 30 in accordance with FIGS. 4-7. The removal unit 30 is screwed onto the end of the container 14, said end being downwardly located in the position of use and said container being arranged upside down to facilitate a complete emptying of the container 14 on removal of sealant. An inlet connection stub 36 and an outlet connection stub 38 arranged offset by 180° thereto are provided at the removal unit 30. The inlet connection stub 36 is designed as a coupling plug of a plug connection and the outlet connection stub 38 is designed as a coupling socket of a plug connection. The compressor further has a compressor connection stub 32 which is likewise designed as a coupling socket of a plug connection. A hose connection stub designed as a coupling plug and not recognizable in FIG. 1 is furthermore attached to the inlet end 24 of the hose 20.

The inlet connection stub 36 of the removal unit 30 can be plugged into the compressor connection stub 32 and the hose connection stub can be plugged into the outlet connection stub 38 of the removal unit 30, with O rings being able to be provided for an optimum sealing of the connection. In a state of the apparatus 10 ready for operation in accordance with the connection configuration shown in FIG. 1, the inlet connection stub 36 of the removal unit 30 is plugged into the compressor connection stub 32 and the hose connection stub is plugged into the outlet connection stub 38 of the removal unit 30.

To prevent an accidental decoupling of the inlet connection stub 36 of the removal unit 30 from the compressor connection stub 32, a locking connection is provided which includes two locking levers 50 which can be actuated by a user. The locking levers 50 are formed by a material strip bent in U shape which is formed in one piece with the removal unit 30 of the container 14. Whereas the locking levers 50 are connected to the removal unit 30 at a vertex 52 of the bent material strip, respective free lever ends 56 of the locking levers 50 project from the removal unit 30.

Since the locking levers 50 are, just as the removal unit 30, manufactured from elastic plastic, the locking levers 50 have a residual tension by which they are biased into the position shown in FIGS. 4-7. To increase the residual tension and to improve the stability of the arrangement, transversely disposed stiffening webs 54 (FIG. 7) are furthermore provided by which the locking levers 50 are each connected to a housing of the removal unit 30 at a support position spaced apart from the vertex 52. Actuation sections 58 which are angled with respect to a longitudinal axis of the locking levers 50 and which have a knurling for easier grasping are furthermore provided at the mutually remote outer sides of the free lever ends 56.

Latching noses 62 are furthermore provided between the vertex 52 and the respective actuation sections 58 at the mutually remote outer sides of the free lever ends 56. As can in particular be seen from FIG. 7, the locking levers 50 are made identically and extend at both sides of the outlet connection stub 38 substantially parallel to its longitudinal axis L. Two guide ribs 64 are molded to the removal unit 30 at an upper region thereof in the position of use of the container 14, said guide ribs 64 forming, in cooperation with a guide groove 66 of the housing 12 recognizable in FIG. 2 and an associated guide web 68, a linear slide guide for guiding the container 14 on the coupling together of the container 14 and of the housing 12.

A cut-out 70 provided at a side of the housing 12 allows an access to the compressor connection stub 32 and furthermore serves to receive the removal unit 30 at least in part in the housing 12 in order thus further to stabilize the connection between the container 14 and the housing 12 serving as a pedestal. The inlet connection stub 36 is plugged into the compressor connection stub 32 in a lateral direction to attach the removal unit 30 to the housing 12, with the guide ribs 64 being brought into engagement with the guide groove 66 and the guide web 68 of the cut-out 70 in order thus to ensure a correct straight-line guide on the coupling. The removal unit 30 can for this purpose be grasped at the knurled actuation sections 58 of the free lever ends 56. As soon as the inlet connection stub 36 is completely plugged into the compressor connection stub 32 and the user optionally releases the free lever ends 56, the latching noses 62 of the locking levers 50 latch into recesses 72 provided at a side wall of the cut-out 70, whereby the connection between the inlet connection stub 36 and the compressor connection stub 32 is locked and the removal unit 30 is fixed at the housing 12.

On a movement of the free lever ends 56 toward one another, the latching noses 62 move out of the recesses 72, whereby the locking connection is released again. To release the locking connection, a user can thus laterally grip around the outlet connection stub 38 of the removal unit 30 and press together the two free lever ends 56, for example by means of the thumb and index finger. Subsequently, the user can pull out the removal unit 30 from the compressor connection stub 32 at the locking levers 50, with the angled actuation sections 58 being helpful for him on the pulling.

Depending on the connection configuration, either a tire to be repaired can be filled with sealant and air or a functional tire can be directly inflated with air from the compressor. The inflation of the intact tire or the sealing of the leaking tire in this respect preferably takes place using one and the same hose 20 so that the user only has to couple the compressor, the container 14 to the removal unit 30 and the outlet end 26 of the hose 20 in the correct manner by means of the coupling plugs and the coupling sockets before putting the apparatus into operation. If the application should require it, however, a separate hose can also be used for the pure inflation of the tire. In the case of a replacement of the container 14, the removal unit 30 with the integrated connection stubs 36, 38 can generally be used again, which is in particular advantageous under environmental aspects.

REFERENCE NUMERAL LIST

10 apparatus
12 housing
14 container
20 hose
22 manometer
24 inlet end
26 outlet end
28 connection piece
30 removal unit
32 compressor connection stub
36 inlet connection stub
38 outlet connection stub
50 locking lever
52 vertex
54 stiffening web
56 free lever end
58 actuation section
62 latching nose
64 guide rib
66 guide groove
68 guide web
70 cut-out
72 recess
80 hollow receiving space
L longitudinal axis

The invention claimed is:

1. An apparatus for introducing air and/or sealant into a tire, said apparatus comprising
   a container for the sealant which has an inlet and an outlet, and
   a pressure generation means,
      wherein the inlet of the container is connectable to the pressure generation means and the outlet of the container is connected or connectable to the inlet end of a hose whose outlet end is connectable to the tire to be filled, and
      wherein a lockable coupling is provided for connecting the pressure generation means to the inlet of the container, with two locking levers attached to the container being designed to release the locking connection of the coupling on a movement of respective free lever ends of said locking levers toward one another.

2. An apparatus in accordance with claim 1, wherein the tire is a motor vehicle tire.

3. An apparatus in accordance with claim 1, wherein the pressure generation means is one of an electric pump and a compressor.

4. An apparatus in accordance with claim 1, wherein the locking levers are biased into a locking position.

5. An apparatus in accordance with claim 4, wherein the locking levers are elastically deformable and are biased into the locking position due to their residual tension.

6. An apparatus in accordance with claim 1, wherein the locking levers are of identical design.

7. An apparatus in accordance with claim 1, wherein the locking levers are attached to the container at both sides of a connection stub of the coupling.

8. An apparatus in accordance with claim 7, wherein the connection stub and the locking levers are formed at a removal unit connected to the container.

9. An apparatus in accordance with claim 8, wherein the removal unit is releasably connected to the container.

10. An apparatus in accordance with claim 1, wherein latching noses are provided at the locking levers and latch into corresponding recesses at the pressure generation means when the pressure generation means is connected to the inlet of the container.

11. An apparatus in accordance with claim 1, wherein knurled actuation sections are provided at mutually remote outer sides of the free lever ends.

12. An apparatus in accordance with claim 11, wherein the actuation sections are angled with respect to a longitudinal axis of the locking levers.

13. An apparatus in accordance with claim 1, wherein the locking levers are formed by a strip bent in U shape of elastic material which is connected to the container at a vertex.

14. An apparatus in accordance with claim 13, wherein the strip bent in U shape of elastic material is connected to a removal unit of the container.

15. An apparatus in accordance with claim 13, wherein the locking levers are each connected by a transversely disposed stiffening web to the container at a support position spaced apart from the vertex.

16. An apparatus in accordance with claim 1, wherein respective connection stubs which are arranged mutually offset by 180° are associated with the inlet and the outlet of the container.

17. An apparatus in accordance with claim 16, wherein a common direction of flow defined by the connection stubs extends in parallel to the respective longitudinal axes of the locking levers.

18. An apparatus in accordance with claim 1, wherein the pressure generation means is accommodated in a housing, with the housing having a cut-out which receives a section of the container.

19. An apparatus in accordance with claim 18, wherein the cut-out receives a removal unit of the container.

20. An apparatus in accordance with claim 18, wherein the free lever ends of the container connected to the pressure generation means project out of the cut-out.

21. An apparatus in accordance with claim 18, wherein a connection for the lockable coupling of the container is arranged in the cut-out.

22. An apparatus in accordance with claim 18, wherein the container can be plugged into the cut-out from the side with an apparatus located in the position of use.

23. An apparatus in accordance with claim 18, wherein a removal unit of the container can be plugged into the cut-out from the side with an apparatus located in the position of use.

24. An apparatus in accordance with claim 18, wherein recesses are provided at a side wall of the cut-out into which recesses respective latching noses of the locking levers can latch.

25. An apparatus in accordance with claim 18, wherein respective slide guides are provided at the housing and at the container for guiding the container on the coupling together of the container and the pressure generation means.

26. An apparatus in accordance with claim 18, wherein the housing has an outwardly open hollow receiving space for a hose connectable to the container and for a cable with plug for connecting the pressure generation means to an electric energy source.

27. An apparatus in accordance with claim 26, wherein the hollow receiving space is designed so that the cable with plug can be accommodated in a first inner section of the hollow receiving space and the remaining outer section of the hollow receiving space is just sufficient for receiving the hose.

* * * * *